US009714014B2

(12) United States Patent
Okada et al.

(10) Patent No.: US 9,714,014 B2
(45) Date of Patent: Jul. 25, 2017

(54) ELECTRIC BRAKE APPARATUS

(71) Applicants: Hitachi Automotive Systems, Ltd., Ibaraki (JP); Mazda Motor Corporation, Hiroshima (JP)

(72) Inventors: Michiharu Okada, Hiroshima (JP); Shigeyuki Uehara, Hiroshima (JP); Kenji Hashida, Zama (JP); Wataru Yokoyama, Kawasaki (JP); Kenichiro Matsubara, Kasumigaura (JP)

(73) Assignees: HITACHI AUTOMOTIVE SYSTEMS, LTD., Ibaraki (JP); MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/668,172

(22) Filed: Mar. 25, 2015

(65) Prior Publication Data
US 2015/0274139 A1   Oct. 1, 2015

(30) Foreign Application Priority Data

Mar. 28, 2014 (JP) ................................ 2014-068936

(51) Int. Cl.
| *B60T 8/17* | (2006.01) |
| *B60T 7/10* | (2006.01) |
| *B60T 13/74* | (2006.01) |
| *B60T 8/172* | (2006.01) |
| *B60T 8/88* | (2006.01) |
| *F16D 55/226* | (2006.01) |
| *F16D 121/24* | (2012.01) |

(52) U.S. Cl.
CPC ................. *B60T 8/17* (2013.01); *B60T 7/10* (2013.01); *B60T 8/172* (2013.01); *B60T 8/885* (2013.01); *B60T 13/741* (2013.01); *F16D 55/226* (2013.01); *B60T 2270/402* (2013.01); *F16D 2121/24* (2013.01)

(58) Field of Classification Search
CPC ............. B60T 8/17; B60T 7/10; B60T 13/741
See application file for complete search history.

(56) References Cited

U.S. PATENT DOCUMENTS

2008/0073970 A1* 3/2008 Griffith ................ B60T 8/1703
303/152

FOREIGN PATENT DOCUMENTS

JP       2007-216896       8/2007

* cited by examiner

*Primary Examiner* — Basil T Jos

(57) ABSTRACT

An electric brake apparatus includes an electric actuator configured to actuate a brake mechanism according to an actuation request signal, and an actuator controller configured to control an operation of the electric actuator with use of a power source mounted at a vehicle to perform control of holding and a release of braking by the brake mechanism. When a system recovers and the actuator controller detects that the control of the holding or the release has been interrupted with an uncompleted control state since system down occurred in the middle of the control of the holding or the release of the braking by the brake mechanism, the actuator controller maintains the interrupted state until a new actuation request signal is issued, and controls the operation of the electric actuator according to the content of the new actuation request signal.

19 Claims, 7 Drawing Sheets

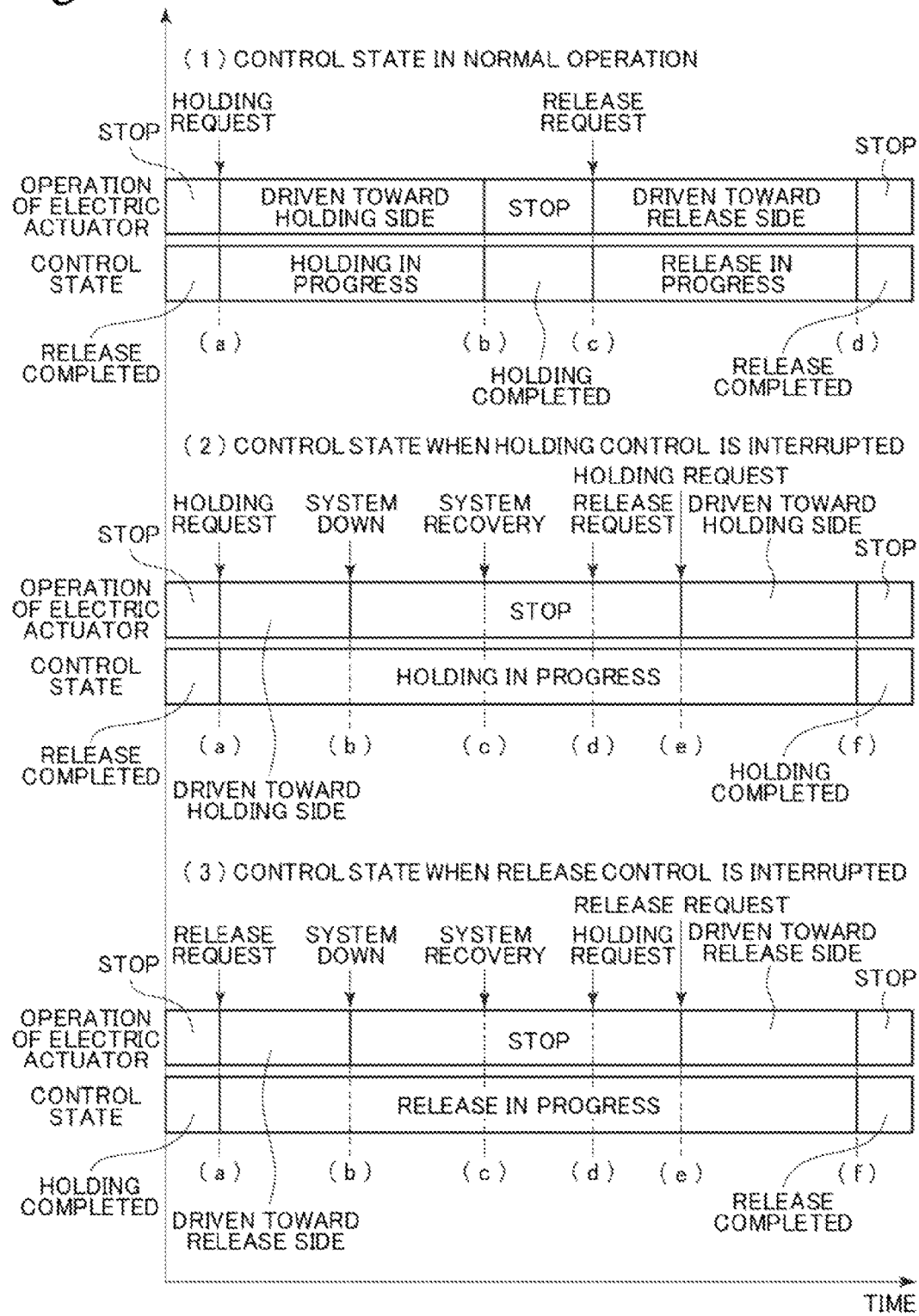

ELECTRIC BRAKE APPARATUS

TECHNICAL FIELD

The present invention relates to an electric brake apparatus that provides a braking force to a vehicle such as an automobile.

BACKGROUND ART

As a brake apparatus mounted on a vehicle such as an automobile, there is known a brake apparatus (an electric brake apparatus) having an electric parking brake function configured to be actuated based on, for example, driving of an electric actuator (for example, Japanese Patent Application Public Disclosure No. 2007-216896).

According to the conventional technique discussed in Japanese Patent Application Public Disclosure No. 2007-216896, if a system stops in the middle of actuation of the parking brake, i.e. in the middle of holding (applying) the parking brake or stopping (releasing) the parking brake to thereby fail to complete the actuation control of the parking brake as a result thereof, this uncompleted control is restarted when the system recovers after that.

SUMMARY

According to the conventional technique discussed in Japanese Patent Application Public Disclosure No. 2007-216896, for example, when the system stops in the middle of the control of holding (applying) the parking brake and the system recovers after that, the control of holding the parking brake is restarted. In this case, for example, if the vehicle is running at this moment, this restart may lead to application of a braking force unintended by a driver.

An object of the present invention is to provide an electric brake apparatus capable of, even if system down occurs in the middle of the control of actuating (holding or releasing) a brake mechanism, performing control according to a driver's intention when the system recovers after that.

According to one embodiment of the present invention, an electric brake apparatus includes an electric actuator configured to actuate a brake mechanism according to an actuation request signal, and an actuator controller configured to control an operation of the electric actuator with use of a power source mounted at a vehicle to perform control of holding and a release of braking by the brake mechanism. When a system recovers and the actuator controller detects that the control of the holding or the release is interrupted with an uncompleted control state after system down occurs in the middle of the control of the holding or the release of the braking by the brake mechanism, the actuator controller maintains the interrupted state until a new actuation request signal is issued, and controls the operation of the electric actuator according to a content of the new actuation request signal when the new actuation request signal is issued.

According to the electric brake apparatus according to the embodiment, even if system down occurs in the middle of the control of actuating (holding or releasing) the brake mechanism, the electric brake apparatus can perform the control according to a driver's intention when the system recovers after that.

BRIEF DESCRIPTION OF DRAWINGS

FIG. 7 illustrates an operation of an electric actuator and a temporal change in a control state.

DESCRIPTION OF EMBODIMENTS

In the following description, brake apparatuses according to embodiments will be described in detail with reference to the accompanying drawings based on an example in which these brake apparatuses are mounted on a four-wheeled automobile.

Figure 1:
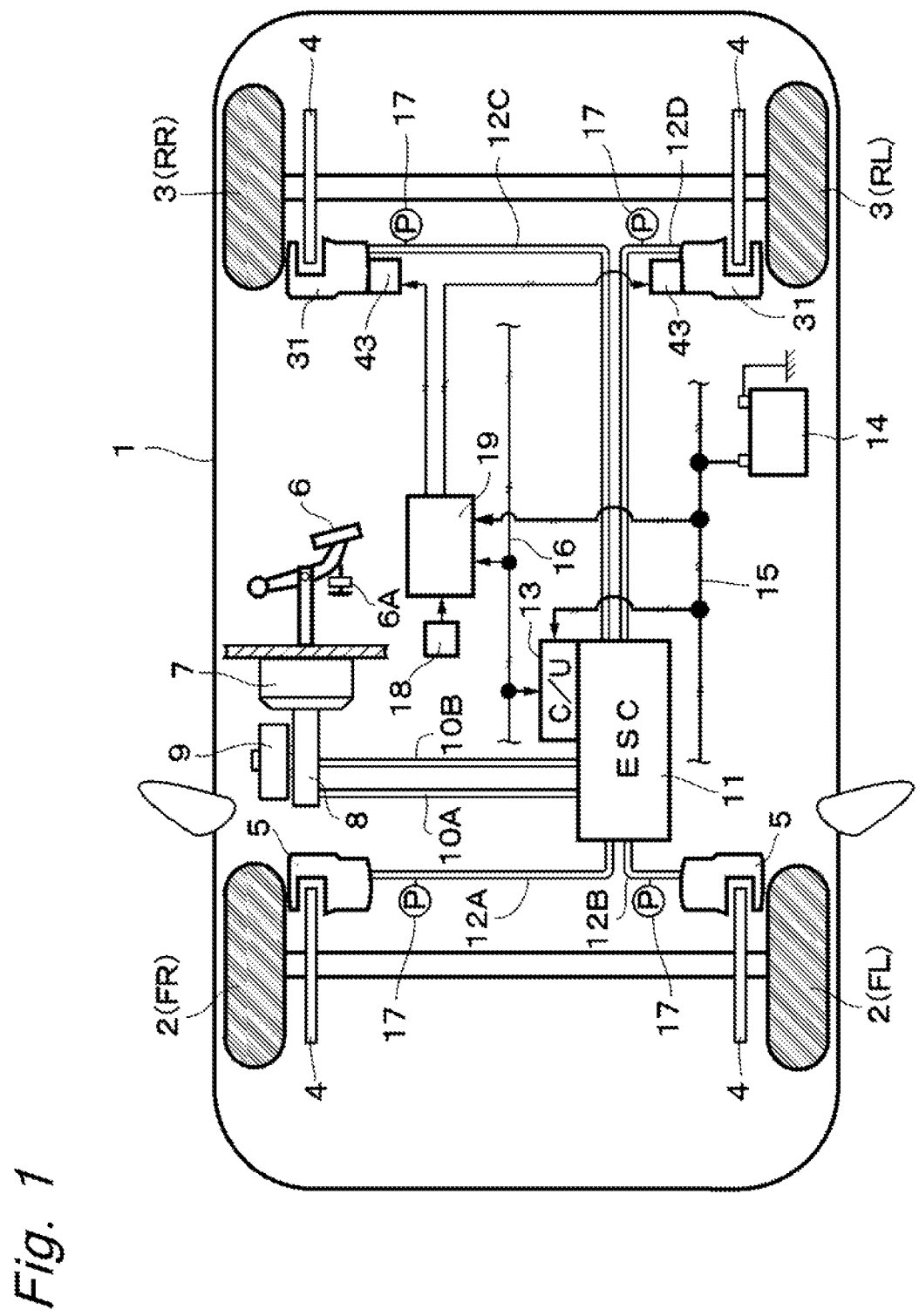
FIG. 1 is a conceptual diagram illustrating a vehicle with an electric brake apparatus according to a first embodiment mounted thereon.

FIGS. 1 to 5 illustrate a first embodiment. Referring to FIG. 1, four wheels, for example, front left and right wheels 2 (FL and FR) and rear left and right wheels 3 (RL and RR) are disposed under (on a road surface side) a vehicle body 1. A disk rotor 4 is disposed at each of these front and rear wheels 2 and 3 as a rotational member (a disk) rotatable together with each of the wheels (each of the front and rear wheels 2 and 3). More specifically, each disk rotor 4 is sandwiched by a hydraulic disk brake 5 at each of the front wheels 2, and each disk rotor 4 is sandwiched by a hydraulic disk brake 31 having an electric parking brake function, which will be described below, at each of the rear wheels 3. As a result, a barking force is provided to each of the wheels (each of the front and rear wheels 2 and 3) independently of one another.

A brake pedal 6 is disposed on a dash board side of the vehicle body 1. The brake pedal 6 is operated by being pressed by a driver when the driver brakes the vehicle. A brake pedal operation detection sensor (a brake sensor) 6A such as a pedal switch or a pedal stroke sensor is disposed at the brake pedal 6. This brake pedal operation detection sensor 6A detects whether and/or how much the brake pedal 6 is operated by being pressed, and outputs a detection signal therefrom to a hydraulic supply apparatus controller 13, which will be described below. The brake pedal operation detection sensor 6A may output the detection signal to a parking brake controller 19, which will be described below.

A pressing operation performed on the brake pedal 6 is transmitted to a master cylinder 8 via a booster 7. The booster 7 includes a negative pressure booster, an electric booster, or the like disposed between the brake pedal 6 and the master cylinder 8, and transmits a pressing force to the master cylinder 8 while boosting the pressing force when the pressing operation is performed on the brake pedal 6. At this time, the master cylinder 8 generates a hydraulic pressure with the aid of brake fluid supplied form a master reservoir 9. The master reservoir 9 is a hydraulic fluid tank containing the brake fluid. The mechanism for generating the hydraulic pressure by the brake pedal 6 is not limited thereto, and may be any mechanism that can generate the hydraulic pressure according to the operation performed on the brake pedal 6, such as a brake-by-wire type mechanism.

The hydraulic pressure generated in the master cylinder 8 is transmitted to a hydraulic supply apparatus 11 (hereinafter referred to as the ESC 11) via, for example, a pair of cylinder-side hydraulic pipes 10A and 10B. This ESC 11 distributes the hydraulic pressure from the master cylinder 8 to the respective disk brakes 5 and 31 via brake-side pipe portions 12A, 12B, 12C, and 12D. As a result, a braking force is provided to each of the wheels (each of the front and rear wheels 2 and 3) as described above.

The ESC 11 is disposed between the respective disk brakes 5 and 31 and the master cylinder 8. The ESC 11 includes the hydraulic supply apparatus controller 13 (hereinafter referred to as the control unit 13) that controls an operation of the ESC 11. The control unit 13 controls the ESC 11, thereby supplying the brake fluid from the brake-side pipe portions 12A to 12D to the respective disk brakes 5 and 31 to perform increasing, reducing, or maintaining brake hydraulic pressures in the respective disk brakes 5 and 31. This operation realizes execution of brake control such as boosting control, braking force distribution control, brake assist control, anti-skid control, traction control, vehicle stability control including skid prevention, and hill start aid control.

The control unit 13 includes a microcomputer or the like. Power is supplied from a battery 14 to the control unit 13 via a power source line 15. Further, as illustrated in FIG. 1, the control unit 13 is connected to a vehicle data bus 16 or the like. The ESC 11 may be replaced with an ABS unit, which is a known art. Alternatively, the ESC 11 may not be disposed (omitted), and the master cylinder 8 may be directly connected to the brake-side pipe portions 12A to 12D.

The vehicle data bus 16 includes a CAN as a serial communication unit mounted on the vehicle body 1. The vehicle data bus 16 performs in-vehicle multiplex communication between the vehicle data bus 16, and a large number of electric devices mounted on the vehicle, in particular, the control unit 13, the parking brake controller 19 that will be described below, and the like. In this case, examples of vehicle information transmitted to the vehicle data bus 16 include information such as detection signals from a steering angle sensor, an accelerator sensor (an accelerator pedal operation detection sensor), a throttle sensor, an engine rotational sensor, the brake sensor (the brake pedal operation detection sensor 6A), a wheel speed sensor, a vehicle speed sensor, an inclination sensor, a G sensor (an acceleration sensor), a stereo camera, a millimeter-wave radar, a safety belt sensor, a transmission sensor, and the like. Further, the examples of this information include detection signals (information) from pressure sensors 17 and the like.

The pressure sensors 17 are disposed at the brake-side pipe portions 12A, 12B, 12C, and 12D, respectively. The pressure sensors 17 respectively independently detect pressures (hydraulic pressures) in the respective pipe lines, i.e., hydraulic pressures (wheel cylinder hydraulic pressures) in calipers 34 (more specifically, cylinder portions 36), which will be described below, corresponding to the pressures in these pipe lines. The vehicle may include a single pressure sensor 17 or two pressure sensors 17. For example, the pressure sensors 17 may be disposed, for example, only at the cylinder-side hydraulic pipes 10A and 10B between the master cylinder 8 and the ESC 11 to detect the hydraulic pressure in the master cylinder.

A parking brake switch 18 is disposed at the vehicle body 1 near a driver's seat (not illustrated), and this parking brake switch 18 is operated by the driver. The parking brake switch 18 functions to transmit a request to actuate parking brake (a holding request or a release request) from the driver to the parking brake controller 19, which will be described below.

When the parking brake switch 18 is operated toward a brake applying side (a parking brake ON side), i.e., when the holding request (a driving request) is issued from the driver, power is supplied to the disk brake 31 on the rear wheel 3 side via the parking brake controller 19, which will be described below, for rotating an electric actuator 43, which will be described below, to a brake applying side. As a result, the disk brake 31 for the rear wheel 3 is placed into such a state that a braking force as the parking brake is provided, i.e., a holding state (an application state). In the present disclosure, applying the parking brake, i.e., providing the braking force as the parking brake will be described with use of the term "hold". This term is used because a predetermined pressing force (a thrust force) is provided to brake pads 33, which will be described below, by driving of the electric actuator 43, and positions of a piston 39 and the brake pads 33 at this time are held by a pressing member holding mechanism (a rotation-linear motion conversion mechanism 40).

On the other hand, when the parking brake switch 18 is operated toward a brake releasing side (a parking brake OFF side), i.e., when the release request is issued from the driver, power is supplied to the disk brake 31 via the parking brake controller 19 for rotating the electric actuator 43 in a reverse direction of the direction when the parking brake is applied. As a result, the disk brake 31 for the rear wheel 3 is placed into such a state that application of the braking force as the parking brake is released, i.e., a stop state (a release state).

The parking brake may be configured to automatically provide (hold) the braking force based on an automatically issued holding request (an automatic holding request) output according to a logic of determining whether to hold the parking brake, which is executed by the parking brake controller 19. A timing when the automatic holding request is output may be, for example, a timing when the vehicle stops running (for example, when the vehicle slows down while running, followed by the speed thereof maintained at a speed lower than 4 km/h for a predetermined time period), a timing when an engine stops (an engine failure), a timing when a shift lever is operated into a P (parking) position, a timing when a door is opened, and a timing when a safety belt is unfastened and the like. Further, the parking brake may be configured to automatically release the braking force based on an automatically issued release request (an automatic release request) output according to a logic of determining whether to release the parking brake, which is executed by the parking brake apparatus 19. A timing when the automatic release request is output may be, for example, a timing when the vehicle starts to run (for example, when the vehicle speeds up from a stopped state, followed by the speed thereof maintained at 5 km/h or higher for a predetermined time period), a timing when an accelerator pedal is operated, a timing when a clutch pedal is operated, and a timing when the shift lever is operated into another position than the P and N (neutral) positions and the like.

Figure 2:
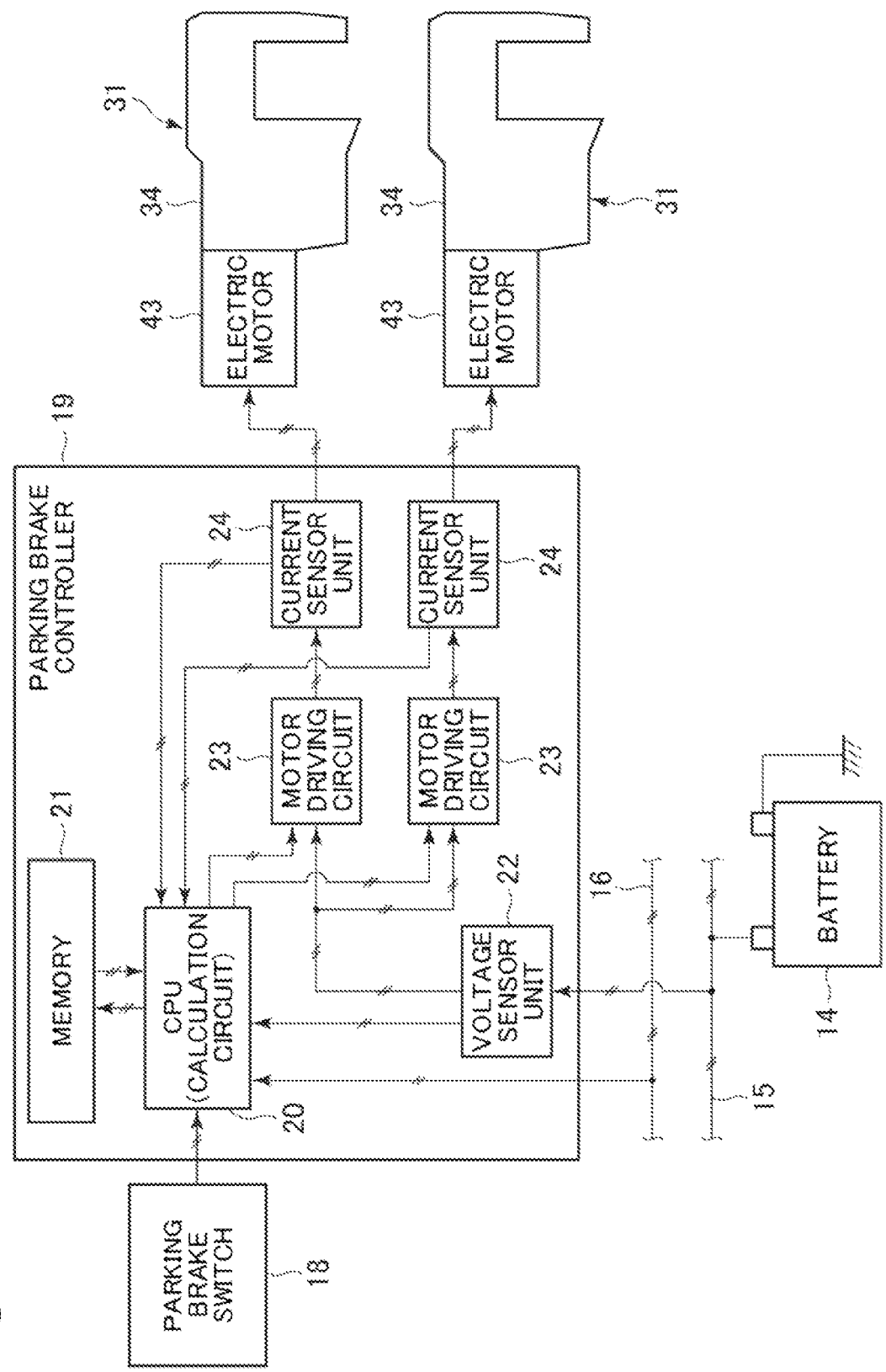
FIG. 2 is a block diagram illustrating a parking brake controller illustrated in FIG. 1.

The parking brake controller 19 functions as an electric brake system (an electric brake apparatus) together with the pair of (left and right) disk brakes 31, which will be described below. As illustrated in FIG. 2, the parking brake controller 19 includes a calculation circuit (CPU) 20 including a microcomputer and the like. Power is supplied from the battery 14 to the parking brake controller 19 via the power source line 15.

The parking brake controller 19 functions as an actuator controller (a controller or a control unit). The parking brake controller 19 controls the electric actuator 43 of each of the disk brakes 31 that will be described below, and generates the braking force when the vehicle is parked or stopped (and when the vehicle is running if necessary). In other words, the parking brake controller 19 actuates (holds or releases) the disk brake 31 as the parking brake (the auxiliary brake if necessary). More specifically, the parking brake controller 19 controls an operation of the electric actuator 43 with use of a power source (the battery 14 in the first embodiment) mounted on the vehicle, thereby controlling holding and a release of the disk brake 31.

When the driver of the vehicle operates the parking brake switch 18, the parking brake controller 19 drives the electric motor 43, which will be described below, based on a signal (an ON or OFF signal) output from the parking brake switch 18, thereby holding (applying) or stopping (releasing) the disk brake 31. Further, the parking brake controller 19 drives the electric actuator 43 to hold or release the disk brake 31 based on the above-described logic of determining whether to hold or release the parking brake, in addition to the signal from the parking brake switch 18.

In this manner, upon receiving an "actuation request signal" including the signal from the parking brake switch 18 or the signal based on the above-described logic of determining whether to hold or release the parking brake, i.e., an "actuation request signal" for requesting actuation (the holding or release) of the parking brake, the parking brake controller 19 holds or releases the disk brake 31 according to this request. At this time, at the disk brake 31, the piston 39 and the brake pads 33 are held or released by the pressing member holding mechanism (the rotation-linear motion conversion mechanism 40) based on driving of the electric actuator 43. Therefore, the "actuation request signal" serves as a signal for actuating the pressing member holding mechanism (the rotation-linear motion conversion mechanism 40) to hold or release the piston 39 and the brake pads 33.

Figure 3:
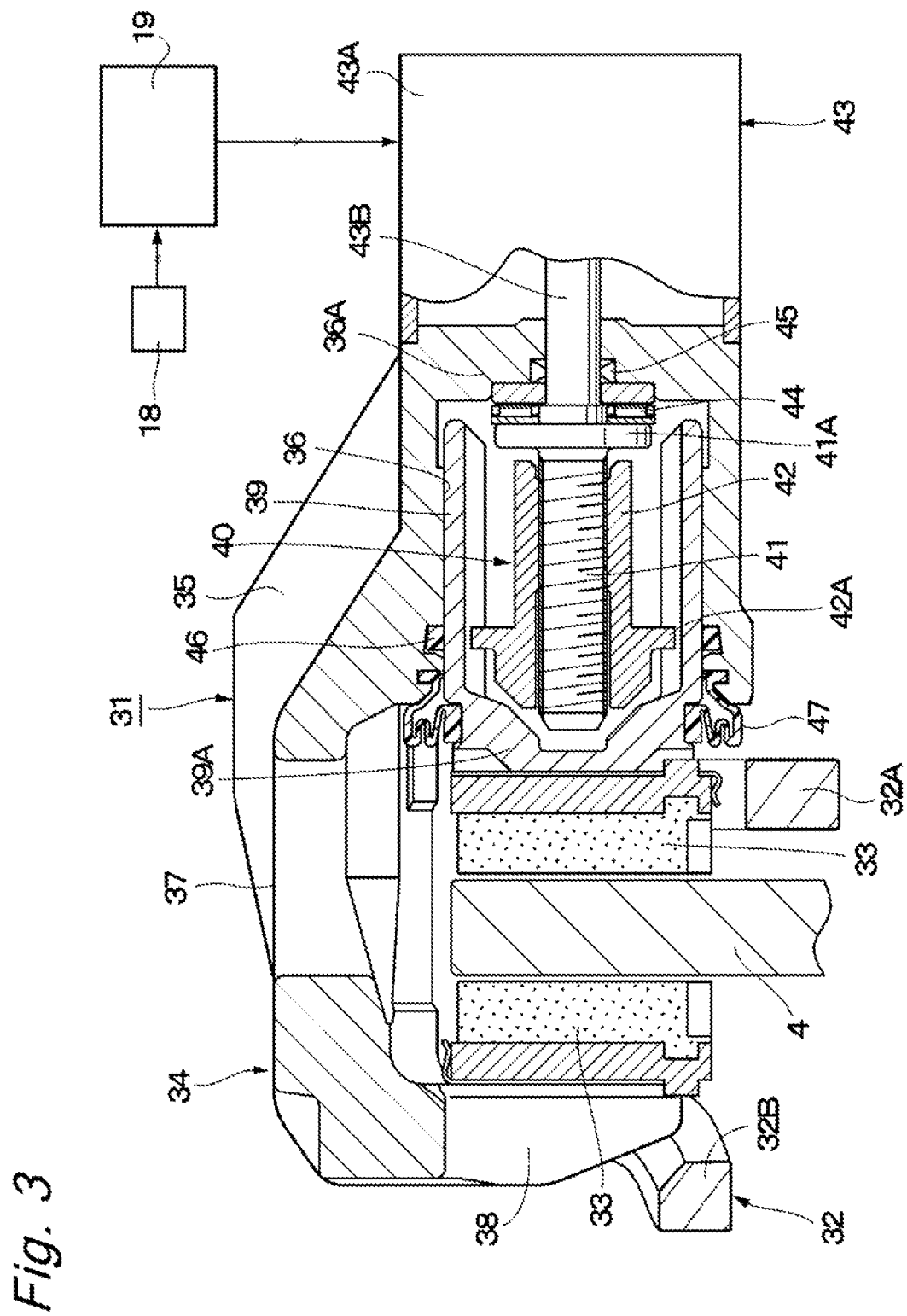
FIG. 3 is an enlarged vertical cross-sectional view illustrating a disk brake having an electric parking brake function that is mounted on a rear wheel side as illustrated in FIG. 1.

As illustrated in FIGS. 1 to 3, an input side of the parking brake controller 19 is connected to the parking brake switch 18 and the like, and an output side of the parking brake controller 19 is connected to the electric actuators 43 and the like of the disk brakes 31. More specifically, as illustrated in FIG. 2, the parking brake switch 18, the vehicle data bus (CAN) 16, a voltage sensor unit 22 that will be described below, motor driving circuits 23, current sensor units 24, and the like, in addition to a storage unit (a memory) 21 that will be described below, are connected to the calculation circuit (CPU) 20 of the parking brake controller 19. Various kinds of vehicle state amounts required to control (actuate) the parking brake, i.e., the above-described various kinds of vehicle information pieces can be acquired from the vehicle data bus 16.

Alternatively, the parking brake controller 19 (the calculation circuit 20 thereof) may acquire the vehicle information by being directly connected to the sensors that detect these information pieces (for example, the accelerator sensor, the throttle sensor, the engine rotational sensor, the brake sensor, the wheel speed sensor, the vehicle speed sensor, the G sensor, and the like), instead of acquiring it from the vehicle data bus 16. Further, the calculation circuit 20 of the parking brake controller 19 can be configured to receive the actuation request signal from the parking brake switch 18 and actuation request signal from another controller (for example, the control unit 13) connected to the vehicle data bus 16.

In this case, for example, the other controller such as the control unit 13 determines whether to hold or release the parking brake according to the above-described determination logic, instead of the parking brake controller 19. In other words, the control unit 13 and the parking brake controller 19 can be integrated with each other.

The parking brake controller 19 includes the storage unit (memory) 21 including, for example, a flash memory, a ROM, a RAM, or an EEPROM (refer to FIG. 2). This storage unit 21 stores, for example, a program for realizing the above-described logic of determining whether to hold or release the parking brake, and a program for realizing processing illustrated in FIG. 4 that will be described below, i.e., processing programs for determining whether to carry out the holding (brake application) and the release (brake release) by the electric actuator 43 of the disk brake 31, and carrying out the holding or the release according to this determination, Further, the storage unit 21 of the parking brake controller 19 stores a control state of the disk brake 31 ("holding completed", "holding in progress", "release completed", "release in progress", or "unknown") in an updatable manner. More specifically, the state of the parking brake by the electric actuator 43, i.e., any state between "holding completed", "holding in progress", "release completed", "release in progress", and "unknown" that corresponds to the state of the piston 39 actuated by the rotation-linear motion conversion mechanism 40, which will be described below, is stored into the storage unit 21 every time this state (status) is changed. In this case, the calculation circuit 20 of the parking brake controller 19 determines which state is set as the control state of the disk brake 31 (the piston 39 thereof), "holding completed", "holding in progress", "release completed", "release in progress", or "unknown", and a result of this determination is stored into the storage unit 21 (the data is overwritten) as needed or at a timing between preceding actuation processing and subsequent actuation processing.

More specifically, the calculation circuit 20 sets a holding flag when the rotation-linear motion conversion mechanism 40 has completed holding the piston 39, and sets a release flag when the rotation-linear motion conversion mechanism 40 has completed releasing the piston 39. The state of the piston 39 actuated by the rotation-linear motion conversion mechanism 40 is stored into the storage unit 21 as "holding (establishment) completed" when the holding flag is set, and as "release completed" when the release flag is set. Further, the state of the piston 39 is stored as "holding (establishment) in progress" or "release in progress" from a start to drive the electric actuator 43 until the holding flag or the release flag is set.

In other words, the state of the disk brake 31 is set to "holding (establishment) in progress" when the rotation-linear motion conversion mechanism 40 starts to hold (establish) the parking brake, and is set to "holding (establishment) completed" upon completion of the holding control (when the holding flag is set). On the other hand, the state of the disk brake 31 is set to "release in progress" when the rotation-linear motion conversion mechanism 40 starts to release the parking brake, and is set to "release completed" upon completion of the release control (when the release flag is set). Further, when the calculation circuit 20 cannot determine which state the status is, "holding completed", "release completed", "holding in progress", or "release in progress" due to, for example a failure to store (write in) the control state into the storage unit 21, the calculation circuit 20 determines that the status is "unknown".

The control state of the disk brake 31 (the state of the rotation-linear motion conversion mechanism 40 or the state of the piston 39) stored in the storage unit 21 is stored in a non-volatile storage device (a memory) that can maintain its storage even without receiving power supply, such as an EEPROM. The storage unit 21 is configured in this manner to allow the information stored in the storage unit 21 to be used immediately, even when the system is temporarily shut down (system down) due to a temporary stop of power supply to the parking brake apparatus 19, and then power returns after that so that the system recovers (the system is started up again). The system down may occur, for example, when power in the power source line 15 becomes unstable and reduces temporarily. In this case, the calculation circuit 20 can determine that the control of holding the parking brake is interrupted (prematurely terminated) if the control state is "holding in progress" when the system recovers, and can determine that the control of releasing the parking brake is interrupted (prematurely terminated) if the control state is "release in progress" when the system recovers.

In the first embodiment, the parking brake controller 19 is configured as a separate individual unit from the control unit 13 of the ESC 11, but may be configured integrally with the control unit 13. Further, the parking brake controller 19 is configured to control the two left and right disk brakes 31, but may be prepared for each of the left and right disk brakes 31. In this case, the parking brake controller 19 can be also mounted integrally with the disk brake 31.

As illustrated in FIG. 2, the parking brake controller 19 includes the voltage sensor unit 22 that detects a voltage from the power source line 15, the left and right motor driving circuits 23 and 23 that drive the left and right electric actuators 43 and 43, respectively, and the left and right current sensor units 24 and 24 that detect motor currents of the left and right electric actuators 43 and 43, respectively. These voltage sensor unit 22, motor driving circuits 23, and current sensor units 24 each are connected to the calculation circuit 20.

This configuration allows the calculation circuit 20 of the parking brake controller 19 to, for example, stop driving the electric actuator 43 based on a motor current value of the electric actuator 43 when holding (applying) or stopping (releasing) the parking brake. In this case, when holding the parking brake, the calculation circuit 20 determines that the state of the piston 39 by the rotation-linear motion conversion mechanism 40 is set to the held state to then stop driving the electric actuator 43, for example, once the motor current value reaches a holding threshold value (a current value corresponding to a thrust force that should be generated at this time). On the other hand, when releasing the parking brake, the calculation circuit 20 determines that the state of the piston 39 by the rotation-linear motion conversion mechanism 40 is set to the released state to then stop driving the electric actuator 43, for example, once the motor current value reaches a preset release threshold value.

Figure 4:
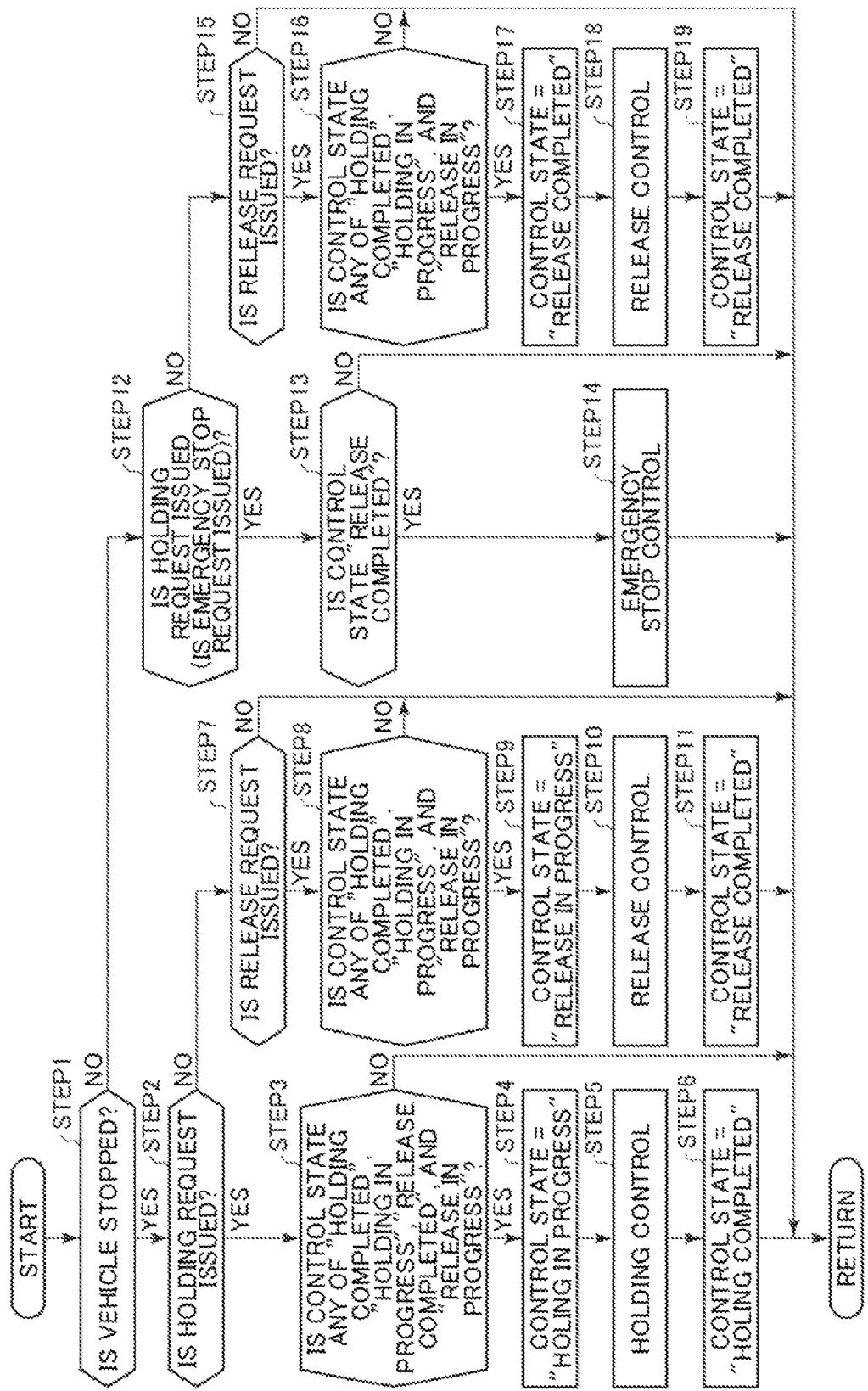
FIG. 4 is a flowchart illustrating control processing performed by the parking brake controller.

According to the first embodiment, the parking brake controller 19 is configured to restart uncompleted control from the middle of the control if a new actuation request signal (a holding actuation request signal or a release actuation request signal) is issued, when the system recovers and the parking brake controller 19 detects that the holding or releasing control is interrupted without being completed after system down occurs in the middle of the control of holding or releasing the disk brake 31. More specifically, the parking brake controller 19 is configured in the following manner. Even when the control of holding or releasing the parking brake is interrupted without being completed, i.e., even when the control is interrupted (for example, system down occurs) with the control state of the disk brake 31 remaining set to "holding in progress" or "release in progress", provided that a new actuation request signal is issued from the parking brake switch 18 or according to the above-described logic of determining whether to hold or release the parking brake as illustrated in FIG. 4 that will be described below, the parking brake controller 19 performs the control according to a content of this new actuation request signal after that (for example, when the system is started up again), instead of unconditionally restarting the interrupted control. In other words, the parking brake controller 19 restarts the control according to the content indicated by the new actuation request signal.

In this case, the parking brake controller 19 is configured to restart the control according to the content indicated by the new actuation request signal even if the content of the new actuation request signal is different from the control state of the uncompleted control, in addition to restarting the control when the content of the new actuation request signal is the same as the control state of the uncompleted control, i.e., restart the control according to the content indicated by the new actuation request signal regardless of whether the content of the new actuation request signal is the same as or different from the control state of the uncompleted control. More specifically, the parking brake controller 19 drives the electric actuator 43 toward a holding side (an application side) to cause the electric actuator 43 to actuate the rotation-linear motion conversion mechanism 40 to hold the parking brake if the new actuation request signal is the holding request, even when the previous control is interrupted with the control state of the disk brake 31 remaining set to "holding in progress" or the previous control is interrupted with the control state of the disk brake 31 remaining set to "release in progress". Further, the parking brake controller 19 drives the electric actuator 43 toward a stop side (a release side) to cause the electric actuator 43 to actuate the rotation-linear motion conversion mechanism 40 to release the parking brake if the new actuation request signal is the release request.

Further, the parking brake controller 19 is configured to prohibit a restart of the control according to the content of the new actuation request signal while the vehicle is running if the new actuation request signal is the actuation request signal for holding the parking brake, even when the parking brake controller 19 detects that the holding or releasing control is interrupted without being completed. More specifically, when the parking brake controller 19 determines that the vehicle is running, the parking brake controller 19 prohibits driving of the electric actuator 43 toward the holding side (the application side) if the content of the new actuation request signal is the holding request (an auxiliary braking request or an emergency stop request), even when the control state of the disk brake 31 is "holding in progress" or "release in progress". The control processing illustrated in FIG. 4 that is performed by the thus-configured parking brake controller 19 will be described in detail below.

Next, configurations of the disk brakes 31 and 31 each having the electric parking brake function, which are mounted on the left and right rear wheel 3 and 3 side, will be described with reference to FIG. 3. FIG. 3 illustrates only one of the left and right disk brakes 31 and 31 respectively mounted so as to correspond to the left and right rear wheels 3 and 3.

The pair of disk brakes 31 respectively mounted on the left and right sides of the vehicle, each of which corresponds to a brake mechanism, are configured as hydraulic disk brakes having the electric parking brake function. The disk brakes 31 function as an electric brake system (an electric brake apparatus) together with the parking brake controller 19. Each of the disk brakes 31 includes a mount member 32 mounted on a non-rotatable portion of the rear wheel 3 side of the vehicle, the inner-side and outer-side brake pads 33 as frictional members, and the caliper 34 that contains the electric actuator 43, which will be described below. In this case, the disk brake 31 is configured to be able to thrust the piston 39 that will then press the brake pads 33, which will be described below, by the hydraulic pressure, and also thrust the piston 39 by the electric actuator 43 in response to the braking request signal issued from the parking brake switch 18 or according to the above-described logic of determining whether to hold the parking brake so as to press the brake pads 33 against the disk rotor 4 to then hold the pressing force of the piston 39, i.e., the pressing force on the brake pads 33.

The mount member 32 includes a pair of arm portions (not illustrated) extending in an axial direction of the disk rotor 4 (i.e., a disk axial direction) over an outer circumference of the disk rotor 4 and spaced apart from each other in a disk circumferential direction, a thick support portion 32A disposed so as to integrally couple proximal end sides of the respective arm portions with each other and fixed to the non-rotatable portion of the vehicle at a position on an inner side with respect to the disk rotor 4, and a reinforcement beam 42B coupling distal end sides of the respective arm portions with each other at a position on an outer side with respect to the disk rotor 4.

The inner-side and outer-side brake pads 33 are disposed so as to be able to abut against both surfaces of the disk rotor 4, and are supported so as to be movable in the disk axial direction by the respective arm portions of the mount member 32. The inner-side and outer-side brake pads 33 are pressed against the both surfaces of the disk rotor 4 by the caliper 34 (a caliper main body 35 and the piston 39), which will be described below.

The caliper 34 is disposed at the mount member 32 so as to extend over the outer circumferential side of the disk rotor 4. The caliper 34 includes the caliper main body 35 supported so as to be movable along the axial direction of the disk rotor 4 relative to the respective arm portions of the mount member 32, and the piston 39 disposed in the caliper main body 35. The rotation-linear motion conversion mechanism 40 and the electric actuator 43, which will be described below, are disposed in the caliper 34.

The caliper main body 35 includes the cylinder portion 36, a bridge portion 37, and a claw portion 38. The cylinder portion 36 is formed into a bottomed cylindrical shape in which one axial side thereof is closed by a partition wall portion 36A and the other axial side thereof that faces the disk rotor 4 is opened. The bridge portion 37 is formed so as to extend over the outer circumferential side of the disk rotor 4 from the cylinder portion 36 in the disk axial direction. The claw portion 38 is arranged so as to extend on an opposite side of the bridge portion 37 from the cylinder portion 36.

The hydraulic pressure is supplied into the cylinder portion 36 of the caliper main body 35 via the brake-side pipe portion 12C or 12D illustrated in FIG. 1 according to the pressing operation performed on the brake pedal 6 or the like. The cylinder portion 36 integrally formed with the partition wall portion 36A. The partition wall portion 36A is disposed between the cylinder portion 36 and the electric motor 43. An output shaft 43B of the electric motor 43 is rotatably inserted in an inner circumferential side of the partition wall portion 36A. The piston 39 as a pressing member, and the rotation-linear motion conversion mechanism 40 that will be described below are disposed in the cylinder portion 36 of the caliper main body 35.

In the first embodiment, the rotation-linear motion conversion mechanism 40 is contained in the piston 39. However, the rotation-linear motion conversion mechanism 40 does not necessarily have to be contained in the piston 39 as long as the rotation-linear motion conversion mechanism 40 is configured to thrust the piston 39.

The piston 39 has an opening on one axial side, and this opening side is inserted in the cylinder portion 36. The other axial side of the piston 39 faces the inner-side brake pad 33, and is closed by a cover portion 39A. The rotation-linear motion conversion mechanism 40 is contained within the piston 39 in the cylinder portion 36, and the piston 39 is configured to be thrust by the rotation-linear motion conversion mechanism 40 in an axial direction of the cylinder portion 36. The rotation-linear motion conversion mechanism 40 functions as the pressing member holding mechanism. More specifically, the rotation-linear motion conversion mechanism 40 serves to thrust the piston 39 in the caliper 34 by an external force, i.e., a force generated by the electric motor 43 instead of thrusting the piston 39 by the supply of the hydraulic pressure into the cylinder portion 36 as described above, and hold the thrust piston 39 and the brake pads 33 thereat. Because the left and right disk brakes 31 are mounted for the left and right rear wheels 3, respectively, the rotation-linear motion conversion mechanisms 40 and the electric actuators 43 are also mounted on the left and right sides of the vehicle, respectively.

The rotation-linear motion conversion mechanism 40 includes a screw member 41 having a rod-like member with a male screw such as a trapezoidal thread formed thereon, and a linearly movable member 42 serving as a thrust member with a female screw hole formed by a trapezoidal thread formed on an inner circumferential side thereof. In other words, the screw member 41 threadably engaged with the inner circumferential side of the linearly movable member 42 serves as a screw mechanism for converting a rotational motion by the electric actuator 43, which will be described below, into a linear motion of the linearly movable member 42. In this case, the female screw of the linearly movable member 42 and the male screw of the screw member 41 are formed with use of highly irreversible screws, in particular, trapezoidal threads in the first embodiment, thereby serving as the pressing member holding mechanism. This pressing member holding mechanism (the rotation-linear motion conversion mechanism 40) is configured to hold the linearly movable member 42 (thus, the piston 39) at an arbitrary position with the aid of a frictional force (a holding force) within the rotation-linear motion conversion mechanism 40 even during a stop of power supply to the electric motor 43. The pressing member holding mechanism may be any configuration that can hold the piston 39 at a position to which the piston 39 is thrust by the electric actuator 43. For example, the pressing member holding mechanism may include another highly irreversible screw than the trapezoidal thread, such as a normal screw triangular in cross-section or a worm gear.

The screw member 41 disposed so as to be threadably engaged with the inner circumferential side of the linearly movable member 42 includes a flange portion 41A, which is a large-diameter flange, on one axial side. The other axial side of the linearly movable member 42 extends toward the cover portion 39A of the piston 39. The screw member 41 is integrally coupled to the output shaft 43B of the electric motor 43, which will be described below, on the flange portion 41A side. Further, an engagement protrusion 42A is formed on an outer circumferential side of the linearly movable member 42. The engagement protrusion 42A prohibits the linearly movable member 42 from rotating relative to the piston 39 (prohibits a relative rotation) while allowing the linearly movable member 42 to axially move relative to the piston 39.

The electric actuator 43 as a parking brake actuator (an electric mechanism) is disposed in a casing 43A. This casing 43A is fixed to the cylinder portion 36 of the caliper main body 35 at a position outside the partition wall portion 36A. The electric actuator 43 actuates (holds or releases) the disk brake 31 according to the above-described actuation request signal (the holding actuation request signal or the release actuation request signal). The electric actuator 43 includes a motor containing a stator, a rotor, and the like according to the known technique, and a reducer that amplifies a torque of the electric motor (all of them are not illustrated). The reducer includes the output shaft 43B that outputs the rotational torque after the amplification. The output shaft 43B axially extends through the partition wall portion 36A of the cylinder portion 36, and is coupled to the flange portion 41A side of the screw member 41 in the cylinder portion 36 so as to be rotatable integrally with the screw member 41.

A coupling means between the output shaft 43B and the screw member 41 may be configured, for example, so as to allow them to move in the axial direction but prohibit them from rotating in the rotational direction. In this case, the output shaft 43B and the screw member 41 are coupled with each other using a known technique such as spline fitting or fitting using a polygonal rod (non-circular fitting). The reducer may be embodied by, for example, a planetary gear reducer or a worm gear reducer. Further, if the reducer is embodied by a known reducer unable to operate reversely (an irreversible reducer) such as a worm gear reducer, a known reversible mechanism such as a ball screw or a ball ramp mechanism can be used as the rotation-linear motion conversion mechanism 40. In this case, the pressing member holding mechanism can be realized by, for example, the reversible rotation-linear motion conversion mechanism and the irreversible reducer.

When the parking brake switch 18 illustrated in FIGS. 1 and 3 is operated toward the brake applying side by the driver, the parking brake controller 19 supplies power to the electric actuator 43 (the electric motor thereof), thereby rotating the output shaft 43B of the electric actuator 43. Therefore, the screw member 41 of the rotation-linear motion conversion mechanism 40 is rotated integrally with the output shaft 43B in, for example, one direction, and thrusts (drives) the piston 39 toward the disk rotor 4 through the linearly movable member 42. As a result, the disk brake 31 sandwiches the disk rotor 4 between the inner-side and outer-side brake pads 33, thereby being placed into such a state that the disk brake 31 is providing the braking force as the electric parking brake, i.e., the holding state (the application state).

On the other hand, when the parking brake switch 18 is operated toward the brake releasing side, the parking brake controller 19 rotationally drives the screw member 41 of the rotation-linear motion conversion mechanism 40 by the electric actuator 43 in the other direction (the reverse direction). As a result, the piston 39 is driven away from the disk rotor 4 via the linearly movable member 42, whereby the disk brake 31 is placed into such a state that application of the braking force as the parking brake is released, i.e., the stop state (the release state).

In this case, in the rotation-linear motion conversion mechanism 40, a relative rotation of the screw member 41 to the linearly movable member 42 causes the linearly movable member 42 to axially relatively move according to a rotational angle of the screw member 41 because the linearly movable member 42 is prohibited from being rotated in the piston 39. In this manner, the rotation-linear motion conversion mechanism 40 converts a rotational motion into a linear motion, which causes the linearly movable member 42 to thrust the piston 39. Further, in addition thereto, the rotation-linear motion conversion mechanism 40 holds the piston 39 and the brake pads 33 at positions to which they are thrust by the electric actuator 43, by holding the linearly movable member 42 at an arbitrary position with the aid of the frictional force.

A thrust bearing 44 is disposed on the partition wall portion 36A of the cylinder portion 36 between the partition wall portion 36A and the flange portion 41A of the screw member 41. This thrust bearing 44 serves to receive a thrust load from the screw member 41, and facilitates a smooth rotation of the screw member 41 relative to the partition wall portion 36A. Further, a seal member 45 is disposed on the partition wall portion 36A of the cylinder portion 36 between the partition wall portion 36A and the output shaft 43B of the electric actuator 43. The seal member 45 seals between the partition wall portion 36A and the output shaft 43B so as to prevent the brake fluid in the cylinder portion 36 from leaking toward the electric actuator 43.

Further, a piston seal 46 as an elastic seal for sealing between the cylinder portion 36 and the piston 39, and a dust boot 47 for preventing a foreign object from entering into the cylinder portion 36 are disposed on the opening end side of the cylinder portion 36. The dust boot 47 is a flexible bellows-like seal member, and is attached between the opening end of the cylinder portion 36 and an outer circumference of the cover portion 39A side of the piston 39.

The disk brakes 5 for the front wheel 2 are configured in an approximately similar manner to the disk brakes 31 for the rear wheel 3, except for the provision of the parking brake mechanism. In other words, the disk brakes 5 for the front wheel 2 include the disk brakes 31 for the rear wheel 3, but do not include the rotation-linear motion conversion mechanism 40, the electric actuator 43, and the like that actuate (hold or release) the parking brake. The disk brakes 31 having the electric parking brake function may also be provided for the front wheel 2, instead of the disk brakes 5, depending on the situation or condition.

The first embodiment has been described based on the example in which this is applied to the hydraulic disk brake 31 including the caliper 34 containing the electric actuator 43. However, embodiments of the present invention are not limited thereto, and may be applied to any brake mechanism that can press (thrust) the frictional member (the pad or the shoe) against the rotational member (the disk rotor or the drum) by the electric actuator (the electric motor) and hold this pressing force. For example, embodiments of the present invention may be applied to an electric disk brake including an electric caliper, an electric drum type brake including an electric drum capable of applying a braking force with use of an electric actuator, a disk brake equipped with an electric drum type parking brake, or the like.

Next, an operation of the brake apparatus of the four-wheeled automobile configured in the above-described manner according to the first embodiment will be described.

When the driver of the vehicle operates the brake pedal 6 by pressing it, this pressing force is transmitted to the master cylinder 8 via the booster 7, and the brake hydraulic pressure is generated by the master cylinder 8. The hydraulic pressure generated in the master cylinder 8 is distributed to the respective disk brakes 5 and 31 via the cylinder-side hydraulic pipes 10A and 10B, the ESC 11, and the brake-side pipe portions 12A, 12B, 12C, and 12D, thereby providing the braking forces onto the respective front left and right wheels 2 and the respective rear left and right wheels 3.

At this time, each of the disk brakes 31 for the rear wheel 3 operates in the following manner. The hydraulic pressure is supplied into the cylinder portion 36 of the caliper 34 via the brake-side pipe portion 12C or 12D, and the piston 39 is slidably displaced toward the inner-side brake pad 33 according to an increase in the hydraulic pressure in the cylinder portion 36. As a result, the piston 39 presses the inner-side brake pad 33 against one side surface of the disk rotor 4. A reaction force at this time causes the whole caliper 34 to be slidably displaced toward the inner side of the disk rotor 4 relative to the respective arm portions or the mount member 32.

As a result, the outer leg portion (the claw portion 38) of the caliper 34 moves so as to press the outer-side brake pad 33 against the disk rotor 4. The disk rotor 4 is sandwiched from axial both sides by the pair of brake pads 33, whereby the braking force based on the hydraulic pressure is generated. On the other hand, when the braking operation with use of the brake pedal 6 is released, the supply of the hydraulic pressure into the cylinder portion 36 is stopped, whereby the piston 39 is displaced so as to retract into the cylinder portion 36. Then, the inner-side and outer-side brake pads 33 are separated from the disk rotor 4, whereby the vehicle is returned into a non-braked state.

Next, when the parking brake switch 18 is operated toward the brake applying side (ON) by the driver of the vehicle, power is supplied from the parking brake controller 19 to the electric actuator 43 of the disk brake 31, whereby the output shaft 43B of the electric actuator 43 is rotationally driven. The disk brake 31 having the electric parking brake function converts the rotational motion of the electric actuator 43 into a linear motion of the linearly movable member 42 through the screw member 41 of the rotation-linear motion conversion mechanism 40 to axially move the linearly movable member 42 to thrust the piston 39. Thus, the pair of brake pads 33 is pressed against the both surfaces of the disk rotor 4.

At this time, the linearly movable member 42 is maintained in the brake applying state with the aid of the frictional force (the holding force) generated between the linearly movable member 42 and the screw member 41 with a pressing reaction force transmitted from the piston 39 serving as a normal force, whereby the disk brake 31 for the rear wheel 3 is actuated (applied) as the parking brake. In other words, even after a stop of power supply to the electric actuator 43, the linearly movable member 42 (thus, the piston 39) can be held at the brake applying position by the female screw of the linearly movable member 42 and the male screw of the screw member 41.

On the other hand, when the driver operates the parking brake switch 18 toward the brake releasing side (OFF), power is supplied from the parking brake controller 19 to the electric actuator 43 so that the motor rotates in the reverse direction, whereby the output shaft 43B of the electric actuator 43 is rotated in the reverse direction of the direction at the time of the actuation (application) of the parking brake. At this time, the holding of the braking force by the screw member 41 and the linearly movable member 42 is released, and the rotation-linear motion conversion mechanism 40 moves the linearly movable member 42 into the cylinder portion 36 in a return direction by a movement amount corresponding to the reverse rotation amount of the electric actuator 43, thereby releasing the braking force of the parking brake (the disk brake 31).

Here, suppose that the control of holding (applying) the parking brake is interrupted in the middle of the control due to a temporary stop of the system (system down) caused by, for example, a temporary reduction in power. One possible exemplary operation when the system recovers after that is to unconditionally restart the interrupted holding control. However, in this case, a braking force unintended by the driver may be provided, for example, if the vehicle is running when the system recovers. On the other hand, suppose that the control of stopping (releasing) the parking brake is interrupted in the middle of the control due to a temporary stop of the system. Unconditionally restarting the interrupted release control when the system recovers after that may result in a release of the parking brake unintended by the driver depending on the condition of the vehicle at that time.

With the aim of improving this situation, the parking brake controller 19 according to the first embodiment is configured in the following manner. When the control of holding or releasing the parking brake is interrupted without being completed, i.e., when the control is interrupted (terminated) with the control state of the disk brake 31 (the electric actuator 43 thereof) remaining set to "holding in progress" or "release in progress", the parking brake controller 19 maintains the interrupted state until issue of a new actuation request signal from the parking brake switch 18 or according to the above-described logic of determining whether to hold or release the parking brake. Then, provided that the above-described new actuation request signal is issued, the parking brake controller 19 performs the control from the control state of the uncompleted control according to the content of this new actuation request signal. In the following description, the control processing (the processing for holding and releasing the parking brake) performed by the calculation circuit 20 of the parking brake controller 19 will be described with reference to FIG. 4. The processing illustrated in FIG. 4 is repeatedly performed at predetermined time intervals (based on a predetermined sampling frequency) as long as power is supplied to the parking brake controller 19.

For example, upon a start of the processing operation illustrated in FIG. 4 according to, for example, a startup of the system (a startup of the vehicle system or a startup of the parking brake controller 19) when an accessory is switched on, an ignition is turned on, the system is powered on, or the like based on an operation performed by the driver, in step 1, the calculation circuit 20 determines whether the vehicle is stopped. The calculation circuit 20 can make this determination based on the speed of the vehicle (the vehicle speed). More specifically, for example, if the vehicle slows down while running with the vehicle speed maintained at a speed lower than 4 km/h for a predetermined time period (for example, 30 ms), the calculation circuit 20 can determine that the vehicle is stopped. If the vehicle speeds up from the stopped state with the vehicle speed maintained at 5 km/h or higher for a predetermined time period (for example, 30 ms), the calculation circuit 20 can determine that the vehicle is running. For example, the speeds of the wheels 2 and 3 (the wheel speeds) acquired from the vehicle data bus 16 can be used as the vehicle speed. Further, not only the wheel speeds, but also information regarding another vehicle speed such as a vehicle speed acquired from a rotational speed of a rotational shaft of a transmission of the vehicle may be used as the vehicle speed at this time.

If the calculation circuit 20 determines "YES", i.e., determines that the vehicle is "stopped" in step 1, the processing proceeds to step 2. In step 2, the calculation circuit 20 determines whether a request to hold the parking brake is issued. As this determination, the calculation circuit 20 can determine that "a holding request is issued", for example, when the parking brake switch 18 is operated toward the brake applying side (the parking brake ON side). Further, in addition thereto, the calculation circuit 20 can determine that "a holding request is issued" when detecting a driver's intention to stop the vehicle other than the operation performed on the parking brake switch 18. For example, the calculation circuit 20 can determine that "a holding request is issued" upon an output of an automatic holding request signal based on the above-described logic of determining whether to hold the parking brake, for example, when the door is opened, when the safety belt is unfastened, or when the shift lever is operated into the P (parking) position. This determination determining that "a holding request is issued" corresponds to the issue of a new actuation request signal in the present embodiment.

If the calculation circuit 20 determines "YES", i.e., determines that a holding request is issued in step 2, the processing proceeds to step 3. In step 3, the calculation circuit 20 determines whether the disk brake 31 is in a control state capable of holding the parking brake. More specifically, the calculation circuit 20 determines whether the control state of the disk brake 31 stored in the storage unit 21 of the parking brake controller 19 is any of "holding completed", "holding in progress", "release completed", and "release in progress". If the calculation circuit 20 determines "YES", i.e., determines that the control state of the disk brake 31 is any of "holding completed", "holding in progress", "release completed", and "release in progress" in step 3, the processing proceeds to step 4. In step 4, the calculation circuit 20 sets the current control state to "holding in progress", i.e., stores "holding in progress" into the storage unit 21 of the parking brake controller 19. Subsequently, in step 5, the calculation circuit 20 performs the holding control. Then, after completing the holding control in step 5, in step 6, the calculation circuit 20 sets the current control state to "holding completed", i.e., stores "holding completed" into the storage unit 21 of the parking brake controller 19 (overwrites the control state of the disk brake 31 with "holding completed"). Then, the processing returns to a START step via a RETURN step, from which the calculation circuit 20 repeats the processes of step 1 and the subsequent steps.

If the control state is "holding completed" in step 3, the calculation circuit 20 performs the holding control in step 5, whereby the electric actuator 43 is driven further from a holding position at that time toward the holding side. This can result in an increase in the braking force (the thrust force) by the parking brake. If the control state is "holding in progress" in step 3, the calculation circuit 20 performs the holding control in step 5, whereby the electric actuator 43 is driven from a position on the way to a holding completion position toward the holding side. In other words, the parking brake controller 19 causes the electric actuator 43 to actuate the rotation-linear motion conversion mechanism 40 to hold the parking brake. As a result, the uncompleted holding control is restarted from a state in the middle of the holding control. Further, if the control state is "release in progress" in step 3, the calculation circuit 20 performs the holding control in step 5, whereby the electric actuator 43 is driven from a position on the way to a release completion position toward the holding side. In other words, the parking brake controller 19 causes the electric actuator 43 to actuate the rotation-linear motion conversion mechanism 40 to hold the parking brake. As a result, the holding control is performed from a state in the middle of the uncompleted release control (the control is restarted). In this manner, the calculation circuit 20 restarts the control according to the content of the holding control indicated by the new actuation request signal regardless of whether the new actuation request signal is the same as or different from the control state of the uncompleted control. Further, if the control state is "release completed" in step 3, the calculation circuit 20 performs the holding control in step 5, whereby the electric actuator 43 is driven from the release completion position toward the holding side. As a result, the barking force is provided by the parking brake.

If the calculation circuit 20 determines "NO", i.e., determines that the control state of the disk brake 31 is "unknown" in step 3, the processing proceeds to the RETURN step while omitting steps 4, 5, and 6, and returns to step 1 via the START step. Then, the calculation circuit 20 repeats the processes of step 1 and the subsequent steps. In other words, if the control state is "unknown", the calculation circuit 20 maintains the control interrupted state without performing the holding control even when a holding request is issued. This means that the parking brake controller 19 is configured to prohibit the electric actuator 43 from actuating the rotation-linear motion conversion mechanism 40 to hold the parking brake if the control state of the uncompleted control is "unknown".

On the other hand, if the calculation circuit 20 determines "NO", i.e., determines that no holding request is issued in step 2, the processing proceeds to step 7. In step 7, the calculation circuit 20 determines whether a request to release the parking brake is issued. As this determination, the calculation circuit 20 can determine that "a release request is issued", for example, when the parking brake switch 18 is operated toward the brake releasing side (the parking brake OFF side). Further, the calculation circuit 20 can also determine than "a release request is issued" when detecting a driver's intention to start the vehicle, in addition to making this determination based on the operation performed on the parking brake switch 18. For example, the calculation circuit 20 can determine that "a release request is issued" upon an output of an automatic release request signal based on the above-described logic of determining whether to release the parking brake, for example, when the accelerator pedal is operated, when the clutch pedal is operated, or when the shift lever is operated into another position than the P position and the N (neutral) position. This determination determining that "a release request is issued" corresponds to the issue of a new actuation request signal in the present embodiment.

If the calculation circuit 20 determines "YES", i.e., determines that "a release request is issued" in step 7, the processing proceeds to step 8. In step 8, the calculation circuit 20 determines whether the disk brake 31 is in a control state capable of releasing the parking brake. More specifically, the calculation circuit 20 determines whether the control state of the disk brake 31 stored in the storage unit 21 of the parking brake controller 19 is any of "holding completed", "holding in progress", and "release in progress". If the calculation circuit 20 determines "YES", i.e., determines that the control state of the disk brake 31 is any of "holding completed", "holding in progress", and "release in progress" in step 8, the processing proceeds to step 9. In step 9, the calculation circuit 20 sets the current control state to "release in progress", i.e., stores "release in progress" into the storage unit 21 of the parking brake controller 19. Subsequently, in step 10, the calculation circuit 20 performs the release control. Then, after completing the release control in step 10, in step 11, the calculation circuit 20 sets the current control state to "release completed", i.e., stores "release completed" into the storage unit 21 of the parking brake controller 19 (overwrites the control state of the disk brake 31 with "release completed"). Then, the processing returns to the START step via the RETURN step, from which the calculation circuit 20 repeats the processes of step 1 and the subsequent steps.

If the control state is "release in progress" in step 8, the calculation circuit 20 performs the release control in step 10, whereby the electric actuator 43 is driven from a position on the way to the release completion position to the release side. In other words, the parking brake controller 19 causes the electric actuator 43 to actuate the rotation-linear motion conversion mechanism 40 to release the parking brake. As a result, the release control is restarted from a state in the middle of the uncompleted release control. Further, if the control state is "holding in progress" in step 8, the calculation circuit 20 performs the release control in step 10, whereby the electric actuator 43 is driven from a position on the way to the holding completion position to the release side. In other words, the parking brake controller 19 causes the electric actuator 43 to actuate the rotation-linear motion conversion mechanism 40 to release the parking brake. As a result, the release control is performed from a state in the middle of the uncompleted holding control (the control is restarted). In this manner, the calculation circuit 20 restarts the control according to the content of the release control indicated by the new actuation request signal regardless of whether the content of the new actuation request signal is the same as or different from the control state of the uncompleted control. Further, if the control state is "holding completed" in step 8, the calculation circuit 20 performs the release control in step 10, whereby the electric actuator 43 is driven from the holding completion position toward the release side. As a result, the barking force is released.

If the calculation circuit 20 determines "NO", i.e., determines that the control state of the disk brake 31 is "release completed" or "unknown" in step 8, the processing proceeds to the RETURN step while omitting steps 9, 10, and 11, and returns to the START step. Then, the calculation circuit 20 repeats the processes of step 1 and the subsequent steps. In other words, the calculation circuit 20 does not perform the release control if the control state is "release completed" or "unknown", even when a release request is issued. This is because it is less necessary to further drive the electric actuator 43 toward the release side when the control state is "release completed", even when a release request is issued. More specifically, further driving the electric actuator 43 toward the release side according to the release request leads to an unnecessary increase in the time required to place the disk brake 31 into the brake applying state when the holding control is performed next time. The parking brake controller 19 does not perform the above-described processing to refrain from taking such wasteful time to place the disk brake 31 into the brake applying state. If the calculation circuit 20 determines "NO" i.e., determines that no release request is issued in step 7, the processing proceeds to the RETURN step while omitting steps 8, 9, 10, and 11, and returns to the START step. Then, the calculation circuit 20 repeats the processes of step 1 and the subsequent steps. In other words, the calculation circuit 20 operates so as to maintain the interrupted state until a new actuation request signal is issued.

On the other hand, if the calculation circuit 20 determines "NO", i.e., determines that the vehicle is running in step 1, the processing proceeds to step 12. In step 12, the calculation circuit 20 determines whether a request to hold the parking brake (an emergency stop request) is issued. As this determination, the calculation circuit 20 can determine that a holding request (an emergency stop request) is issued, for example, when the parking brake switch 18 is operated by the driver toward the brake applying side (the parking brake ON side) for a predetermined time period (for example, one second) or longer.

If the calculation circuit 20 determines "YES", i.e., determines that "a holding request (an emergency stop request) is issued" in step 12, the processing proceeds to step 13. In step 13, the calculation circuit 20 determines whether the disk brake 31 is in a control state capable of holding the parking brake (emergency stop control). More specifically, the calculation circuit 20 determines whether the control state of the disk brake 31 is "release completed". If the calculation circuit 20 determines "YES", i.e., determines that the control state of the disk brake 31 is "release completed" in step 13, the processing proceeds to step 14. Then, the calculation circuit 20 performs the control of holding the parking brake, i.e., the emergency stop control using the parking brake as the auxiliary brake.

In this emergency stop control, for example, the parking brake controller 19 drives the electric actuator 43 toward the holding side so as to generate a weaker braking force than the braking force provided as the parking brake when the vehicle is stopped (the braking force enough for the vehicle to remain stopped). In this case, for example, the parking brake controller 19 can perform even the ABS control for preventing the wheels 2 and 3 from slipping by driving the electric actuator 43 based on the wheel speed information detected by the control unit 13 of the ESC 11. More specifically, the parking brake controller 19 may perform the control so as to hold the brake by driving the electric actuator 43 toward the holding side when the wheel (the rear wheel 3) is not locked, while intermittently releasing the brake by driving the electric actuator 43 toward the release side when the wheel (the rear wheel 3) is locked. As a result, the parking brake controller 19 can stop the running vehicle stably. Upon completion of the holding control (the emergency stop control) in step 14, the processing returns to the START step via the RETURN step. Then, the calculation circuit 20 repeats the processes of step 1 and the subsequent steps. In the holding control (the emergency stop control) in this case, the parking brake controller 19 generates a weaker braking force than the braking force provided as the parking brake, whereby the calculation circuit 20 maintains the control state set to "release completed" (does not overwrite the control state with "holding completed").

If the calculation circuit 20 determines "NO", i.e., determines that the control state of the disk brake 31 is any of "holding completed", "holding in progress", "release in progress", and "unknown" in step 13, the processing proceeds to the RETURN step while omitting step 14, and returns to the START step. Then, the calculation circuit 20 repeats the processes of step 1 and the subsequent steps. In other words, if the control state is any of "holding completed", "holding in progress", "release in progress", and "unknown", especially, if the control state is "holding in progress" or "release in progress" indicating that the holding or release control is interrupted without being completed, the calculation circuit 20 does not perform the holding control (the emergency stop control) even when a holding request is issued. In this case, for example, when the control state is any of "holding completed", "holding in progress", "release in progress", and "unknown", there may be a difference between the strength of the braking force at the left disk brake 31 and the strength of the braking force at the right disk brake 31. The calculation circuit 20 does not perform the holding control at this time because providing the braking force by the parking brake from this state as the auxiliary brake (performing the emergency stop control) may result in formation of a vehicle orientation undesired by the driver, and therefore is considered to be unfavorable. In this case, if the driver wants to hold the parking brake (stop the vehicle emergently), the driver can exert the emergency stop using the parking brake as the auxiliary brake by first operating the parking brake switch 18 toward the brake releasing side to release the parking brake (completely release the parking brake), and then operating the parking brake switch 18 toward the brake applying side.

On the other hand, if the calculation circuit 20 determines "NO", i.e., determines that no holding request (no emergency stop request) is issued in step 12, the processing proceeds to step 15. The processes of steps 15 to 19 are similar to the processes when a release request is issued that have been described above in the descriptions of steps 7 to 11, and therefore are not described here.

Figure 5:
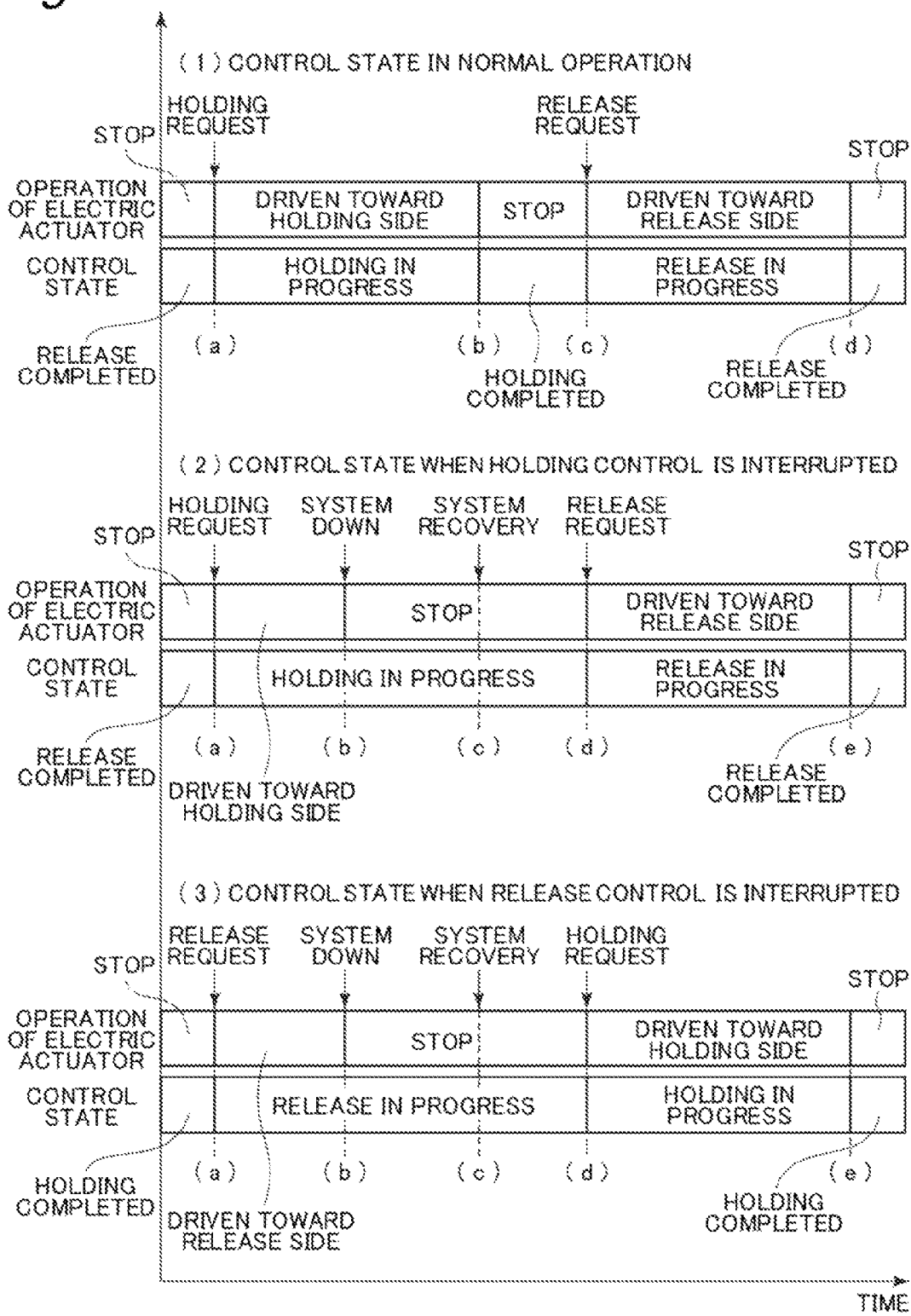
FIG. 5 illustrates an operation of an electric actuator and a temporal change in a control state.

FIG. 5 illustrates how the control, state shifts according to the first embodiment.

In FIG. 5, "(1) CONTROL STATE IN NORMAL OPERATION" indicates the control state when the holding control and the release control are completed normally. The control state is set to "release completed" when the operation starts, and the electric actuator 43 is not working at this moment. When a holding request is issued at timing (a), the electric actuator 43 is driven toward the holding side, and the control state is switched to "holding in progress" (the storage in the storage unit 21 is overwritten with "holding in progress"). When the holding control is completed at timing (b), the electric actuator 43 stops, and the control state is switched to "holding completed" (the storage in the storage unit 21 is overwritten with "holding completed"). When a release request is issued at timing (c), the electric actuator 43 is driven toward the release side, and the control state is switched to "release in progress" (the storage in the storage unit 21 is overwritten with "release in progress"). When the release control is completed at timing (d), the electric actuator 43 stops, and the control state is switched to "release completed" (the storage in the storage unit 21 is overwritten with "release completed").

On the other hand, "(2) CONTROL STATE WHEN HOLDING CONTROL IS INTERRUPTED" indicates the control state when the holding control is interrupted. The control state is set to "release completed" when the operation starts, and the electric actuator 43 is not working at this moment. When a holding request is issued at timing (a), the electric actuator 43 is driven toward the holding side, and the control state is switched to "holding in progress". When the system is shut down (system down) at timing (b), the electric actuator 43 stops. When the system is started up (a system recovery) at timing (c), the stored control state is set to (detected as) "holding in progress" but the electric actuator 43 is not driven because no new actuation request signal is issued. When a release request (a new actuation request signal) is issued at timing (d), the electric actuator 43 starts to be driven toward the release side, and the control state is switched to "release in progress". When the release control is completed at timing (e), the electric actuator 43 stops, and the control state is switched to "release completed".

Further, "(3) CONTROL STATE WHEN RELEASE CONTROL IS INTERRUPTED" indicates the control state when the release control is interrupted. The control state is set to "holding completed" when the operation starts, and the electric actuator 43 is not working at this moment. When a release request is issued at timing (a), the electric actuator 43 is driven toward the release side, and the control state is switched to "release in progress". When system down occurs at timing (b), the electric actuator 43 stops. When the system is started up (a system recovery) at timing (c), the stored control state is set to (detected as) "release in progress" but the electric actuator 43 is not driven because no new actuation request signal is issued. When a holding request (a new actuation request signal) is issued at timing (d), the electric actuator 43 starts to be driven toward the holding side, and the control state is switched to "holding in progress". When the holding control is completed at timing (e), the electric actuator 43 stops and the control state is switched to "holding completed".

According to the first embodiment, even when the system is shut down in the middle of the control of actuating (holding or releasing) the parking brake, the parking brake controller 19 can safely perform the control according to a driver's intention when the system recovers after that.

More specifically, according to the first embodiment, provided that a new actuation request signal is issued, the parking brake controller 19 performs the control according to the content of this new actuation request signal from the control state of the uncompleted control to restart the control from the interrupted state by executing the processes of steps 2, 3, 7, 8, 12, 15, and 16. As a result, based on the new actuation request signal consistent with a driver's intention to stop or run the vehicle, the parking brake controller 19 can perform the control according to the content of this new actuation request signal. Therefore, the parking brake controller 19 can perform the control according to the driver's intention when the system recovers.

According to the first embodiment, the parking brake controller 19 is configured to restart the control according to a new actuation request signal, both of when the content of this new actuation request signal is the same as (matches) the control state of the uncompleted control, and when the content of this new actuation request signal is different from the control state of the uncompleted control, by executing the processes of steps 3, 8, and 12. In other words, the parking brake controller 19 is configured to restart the control according to a new actuation request signal regardless of whether the content of this new actuation request signal is the same as or different from the control state of the uncompleted control. Therefore, based on the new actuation request signal consistent with the driver's intention to stop or run the vehicle, the parking brake controller 19 can restart the control according to this new actuation request signal.

According to the first embodiment, the parking brake controller 19 is configured to prohibit a restart of the control according to the content of a new actuation request signal that is the actuation request signal for holding the disk brake 31 if the parking brake controller 19 determines that the vehicle is running in step 1, even when the parking brake controller 19 detects that the holding or release control is interrupted without being completed, by executing the process of step 13. As a result, the parking brake controller 19 can stably carry out the emergency stop using the parking brake as the auxiliary brake while the vehicle is running.

Figure 6:
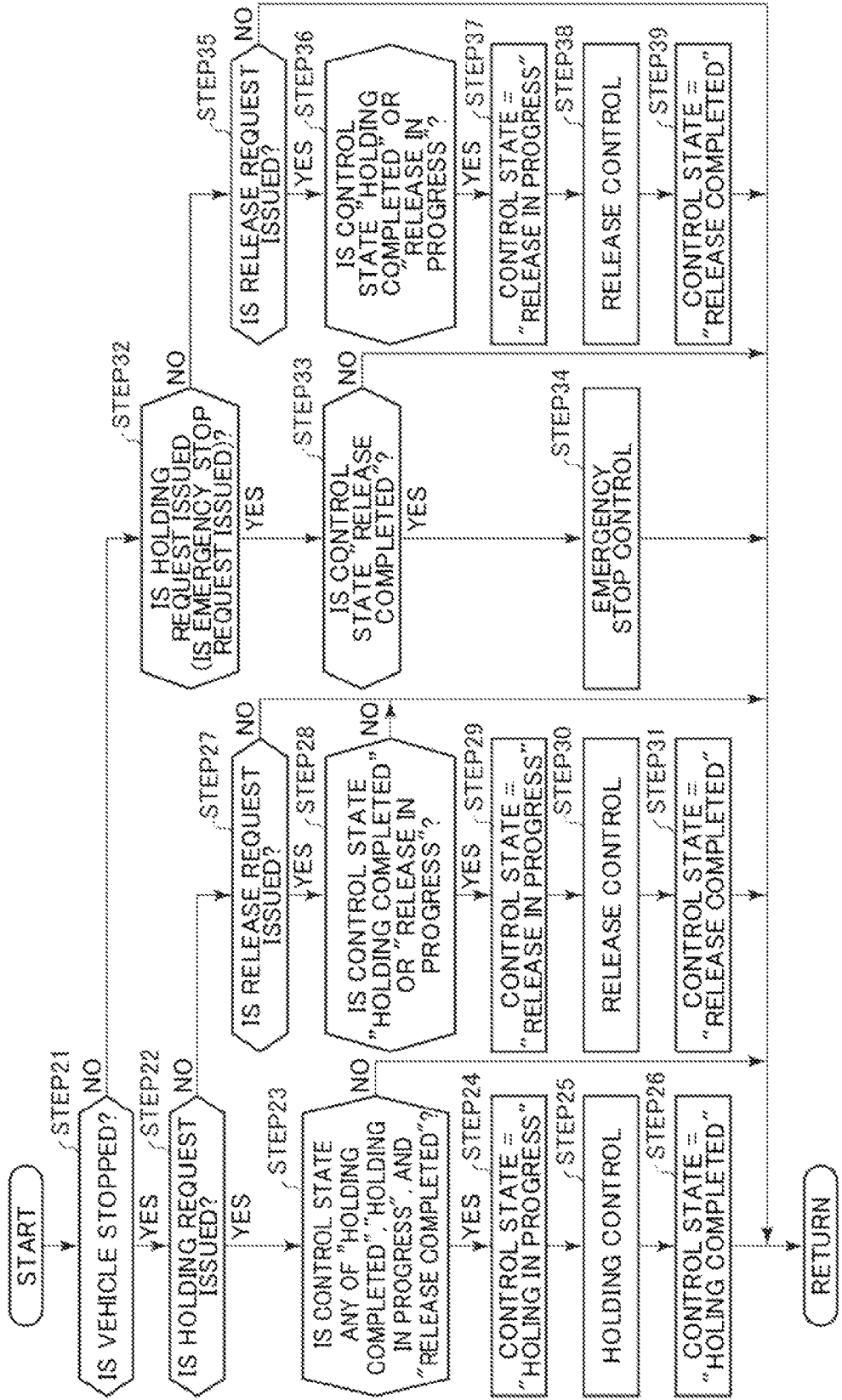
FIG. 6 is a flowchart illustrating control processing performed by a parking brake controller according to a second embodiment.

Next, FIGS. 6 and 7 illustrate a second embodiment. The second embodiment is characterized in that the parking brake controller 19 is configured to restart the control according to a new actuation request signal if this actuation request signal is the same as (matches) the actuation request signal of the uncompleted control, while prohibiting a restart of the control according to the content indicated by a new actuation request signal if this new actuation request signal is different from the actuation request signal of the uncompleted control. In other words, the parking brake controller 19 is configured to restart the control according to the content of a new actuation request signal only when the content of this new actuation request signal matches the actuation request signal of the uncompleted control. In the following description, the second embodiment will be described, identifying similar components or features to the above-described first embodiment by the same reference numerals, and omitting descriptions thereof.

Processes of steps 21 and 22 illustrated in FIG. 6 are similar to the processes of steps 1 and 2 illustrated in FIG. 4 according to the above-described first embodiment. Step 23 is a process employed in the second embodiment instead of step 3 in the first embodiment. In step 23 after the calculation circuit 20 determines that "a holding request is issued" in step 22, the calculation circuit 20 determines whether the control state of the disk brake 31 is any of "holding completed", "holding in progress", and "release completed". If the calculation circuit 20 determines "YES", i.e., determines that the control state of the disk brake 31 is any of "holding completed", "holding in progress", and "release completed" in step 23, the processing proceeds to step 24. Then, the calculation circuit 20 restarts the "holding" control that is the content of this new actuation request signal. Processes of steps 24 to 26 are similar to the processes of steps 4 to 6 illustrated in FIG. 4 according to the above-described first embodiment.

On the other hand, if the calculation circuit 20 determines "NO", i.e. determines that the control state of the disk brake 31 is "unknown" or "release in progress" in step 23, the processing proceeds to the RETURN step while omitting steps 24, 25, and 26, and returns to the START step. Then, the calculation circuit 20 repeats the processes of step 1 and the subsequent steps. In other words, if the control state is "unknown" or "release in progress", the calculation circuit 20 does not perform the holding control even when a holding request is issued. In this manner, the parking brake controller 19 prohibits a restart of the control according to the content indicated by a new actuation request signal if the content of this new actuation request signal (the holding request) is different from the control state of the uncompleted control (release in progress).

Processes of step 27, 29, 30, and 31 are similar to the processes of steps 7, 9, 10, and 11 illustrated in FIG. 4 according to the above-described first embodiment. Step 28 is a process employed in the second embodiment instead of step 8 in the first embodiment. In this step 28, the calculation circuit 20 determines whether the control state of the disk brake 31 is "holding completed" or "release in progress". If the calculation circuit 20 determines "YES", i.e., determines that the control state of the disk brake 31 is "holding completed" or "release in progress" in step 28, the processing proceeds to step 29. Then, the calculation circuit 20 restarts the "release" control that is the content of this new actuation request signal.

On the other hand, if the calculation circuit 20 determines "NO" i.e., determines that the control state of the disk brake 31 is any of "unknown", "holding in progress", and "release completed" in step 28, the processing proceeds to the RETURN step while omitting steps 29, 30, and 31, and returns to the START step. Then, the calculation circuit 20 repeats the processes of step 21 and the subsequent steps. In other words, the calculation circuit 20 does not perform the release control if the control state is any of "unknown", "holding in progress", and "release completed", even when a release request is issued. In this manner, the parking brake controller 19 prohibits a restart of the control according to the content indicated by a new actuation request signal if the content of this actuation request signal (the release request) is different from the control state of the uncompleted control (holding in progress).

Processes of steps 32 to 34 are similar to the processes of steps 12 to 14 illustrated in FIG. 4 according to the above-described first embodiment. Processes of steps 35 to 39 are similar to the processes of steps 27 to 31.

FIG. 7 illustrates how the control state shifts according to the second embodiment.

In FIG. 7, "(1) CONTROL STATE IN NORMAL OPERATION" is similar to the above-described first embodiment ("(1) CONTROL STATE IN NORMAL OPERATION" illustrated in FIG. 5), and therefore is not described here.

On the other hand, "(2) CONTROL STATE WHEN HOLDING CONTROL IS INTERRUPTED" indicates the control state when the holding control is interrupted. The control state is set to "release completed" when the operation starts, and the electric actuator 43 is not working at this moment. When a holding request is issued at timing (a), the electric actuator 43 is driven toward the holding side, and the control state is switched to "holding in progress". When the system is shut down (system down) at timing (b), the electric actuator 43 stops.

When the system is started up (a system recovery) at timing (c), the stored control state is set to (detected as) "holding in progress" but the electric actuator 43 is not driven because no new actuation request signal is issued. Even when a release request (a new actuation request signal) is issued at timing (d), the electric actuator 43 does not start to be driven toward the release side. This is because the release request at timing (d) is different from the control state at that time ("holding in progress": the holding request at timing (a)). Then, when a holding request (a new actuation request signal) is issued at timing (e), the electric actuator 43 starts to be driven toward the holding side. This is because the holding request at timing (e) matches the control state at that time ("holding in progress": the holding request at timing (a)) in this case. Then, when the holding control is completed at timing (f), the electric actuator 43 stops, and the control state is switched to "holding completed".

Further, "(3) CONTROL STATE WHEN RELEASE CONTROL IS INTERRUPTED" indicates the control state when the release control is interrupted. The control state is set to "holding completed" when the operation starts, and the electric actuator 43 is not working at this moment. When a release request is issued at timing (a), the electric actuator 43 is driven toward the release side, and the control state is switched to "release in progress". When the system is shut down (system down) at timing (b), the electric actuator 43 stops.

When the system is started up (a system recovery) at timing (c), the stored control state is set to (detected as) "release in progress" but the electric actuator 43 is not driven because no new actuation request signal is issued. Even when a holding request (a new actuation request signal) is issued at timing (d), the electric actuator 43 does not start to be driven toward the holding side. This is because the holding request at timing (d) is different from the control state at that time ("release in progress": the release request at timing (a)). Then, when a release control (a new actuation request signal) is issued at timing (e), the electric actuator 43 starts to be driven toward the release side. This is because the release request at timing (e) matches the control state at that time ("release in progress": the release request at timing (a)) in this case. Then, when the release control is completed at timing (f), the electric actuator 43 stops and the control state is switched to "release completed".

The second embodiment is characterized in that the parking brake controller 19 determines whether to perform the holding or release control by executing step 23, 28, or 36 in the above-described manner, and the basic operation thereof is not significantly different from the above-described first embodiment.

Especially, according to the second embodiment, the parking brake controller 19 is configured to restart the control according to the content indicated by a new actuation request signal if the content of this new actuation request signal is the same as the control state of the uncompleted control, while prohibiting a restart of the control according to the content indicated by a new actuation request signal if the content of this new actuation request signal is different from the control state of the uncompleted control, by executing the process of step 23, 28, or 36. In other words, the parking brake controller 19 prohibits a restart of the control if the content of the new actuation request signal is different from the control state of the uncompleted control. As a result, the parking brake controller 19 can perform the control further consistently with a driver's intention.

It is possible to easily realize both the above-described first and second embodiments by selecting (setting) the processing program (the control logic) to be stored in the memory of the parking brake controller 19, for example, at the time of manufacturing or shipping. In this case, even if the system is configured to have a mechanical limitation such as a limitation prohibiting a start of a next operation until complete completion of the holding or the release, it is possible to flexibly deal with the first and second embodiments according to which processing program (control logic) is selected (set).

The above-described respective embodiments have been described based on the example in which the disk brake 31 having the electric parking brake function is used as each of the brakes on the left and right rear wheel sides. However, the present invention is not limited thereto. For example, the disk brake having the electric parking brake function may be used as each of brakes on the all wheels (all) of the four wheels).

The above-described embodiments have been described based on the example in which the brake mechanism is embodied by the hydraulic disk brake 31 equipped with the electric parking brake. However, the present invention is not limited thereto. For example, the above-described embodiments may be applied to an electric disk brake that does not require hydraulic supply. Further, the present invention is not limited to the disk brake type brake mechanism. For example, the above-described embodiments may be applied to a drum brake type brake mechanism. Further, for example, the above-described embodiments may be applied to a drum-in disk brake in which a drum type electric parking brake is provided in a disk brake.

According to the above-described embodiments, even if the system is shut down in the middle of the control of actuating (holding or releasing) the brake mechanism, the actuator controller can perform the control according to a driver's intention when the system recovers after that.

More specifically, the actuator controller restarts the uncompleted control from the middle of the control, provided that a new actuation request signal is issued. As a result, the actuator controller can restart the uncompleted control based on a new actuation request signal according to a driver's intention to stop or run the vehicle. Therefore, the actuator controller can perform the control according to the driver's intention when the system recovers.

According to one embodiment of the present invention, the actuator controller restarts the control according to the content indicated by a new actuation request signal regardless of whether the content of this new actuation request signal is the same as or different from the control state of the uncompleted control. In this case, the actuator controller can restart the control according to the new actuation request signal, based on the new actuation request signal consistent with a driver's intention to stop or run the vehicle.

According to one embodiment of the present invention, the actuator controller restarts the control according to the content indicated by a new actuation request signal if the content of this new actuation request signal is the same as the control state of the uncompleted control, while prohibiting a restart of the control according to the content indicated by a new actuation request signal if the content of this new actuation request signal is different from the control state of the uncompleted control. In this case, the actuator controller prohibits a restart of the control if the new actuation request signal is different from the actuation request signal of the uncompleted control, thereby succeeding in performing the control further consistently with a driver's intention.

According to one embodiment of the present invention, the actuator controller prohibits a restart of the control according to the content indicated by a new actuation request signal that is the actuation request signal for holding the brake mechanism while the vehicle is running, even if the actuator controller detects that the holding or release control is interrupted without being completed. In this case, the actuator controller can stably carry out the emergency stop using the parking brake as the auxiliary brake when the vehicle is running.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Applications No. 2014-068936 filed on Mar. 28, 2014. The entire disclosure of Japanese Patent Application No. 2014-068936 filed on Mar. 28, 2014 including specification, claims, drawings and summary are incorporated herein by reference in its entirety.

What is claimed is:

1. An electric brake apparatus comprising:
    an electric actuator configured to actuate a brake mechanism according to an actuation request signal; and
    an actuator controller configured to control an operation of the electric actuator with use of a power source mounted at a vehicle to perform control of a holding of braking and a release of braking by the brake mechanism,
    wherein, when a system recovers following interruption with a control state of an uncompleted control of the holding of braking or the release of braking by the brake mechanism after system down occurs and thus the electric actuator is stopped in a middle of the control of the holding of braking or the release of braking by the brake mechanism, the actuator controller is configured to maintain a state in which the electric actuator was stopped during the system down, until a new actuation request signal according to a signal from a parking brake switch after recovery of the system and/or according to a logic of determining whether to hold or release the braking by the brake mechanism is issued, and is further configured to control operation of the electric actuator according to a content of the new actuation request signal when the new actuation request signal is issued.

2. The electric brake apparatus according to claim 1, wherein the actuator controller is further configured to restart the control of the holding of braking or the release of braking by the brake mechanism according to the content of the new actuation request signal regardless of whether the content of the new actuation request signal is the same as or different from the control state of the uncompleted control.

3. The electric brake apparatus according to claim 1, wherein, when the vehicle is stopped and the content of the new actuation request signal indicates the holding of braking, if the control state of the uncompleted control indicates the holding of braking is in progress, or the release of braking is in progress, the actuator controller is configured to cause the electric actuator to actuate the brake mechanism to hold the braking.

4. The electric brake apparatus according to claim 1, wherein, when the vehicle is stopped and the content of the new actuation request signal indicates the release of braking, if the control state of the uncompleted control indicates the holding of braking is in progress or the release of braking is in progress, the actuator controller is configured to cause the electric actuator to actuate the brake mechanism to release the braking.

5. The electric brake apparatus according to claim 1, wherein the actuator controller is configured to restart the control according to the new actuation request signal if the content of the new actuation request signal is the same as the control state of the uncompleted control, and is configured to prohibit a restart of the control according to the content of the new actuation request signal if the content of the new actuation request signal is different from the control state of the uncompleted control.

6. The electric brake apparatus according to claim 1, wherein, when the vehicle is stopped and the new actuation request signal indicates the holding of braking, if the control state of the uncompleted control indicates the release of braking is in progress, the actuator controller is configured not to cause the electric actuator to actuate the brake mechanism to hold the braking.

7. The electric brake apparatus according to claim 1, wherein, when the vehicle is stopped and the new actuation request signal indicates the release of braking, if the control state of the uncompleted control indicates the holding of braking is in progress, the actuator controller is configured not to cause the electric actuator to actuate the brake mechanism to release the braking.

8. The electric brake apparatus according to claim 1, wherein, when the vehicle is running, the actuator controller is configured to prohibit a restart of the control according to the content indicated by the new actuation request signal for the holding of braking by the brake mechanism even if the actuator controller detects that the control of the holding of braking or the release of braking is interrupted without being completed.

9. The electric brake apparatus according to claim 8, wherein, when the vehicle is running and the content of the new actuation request signal indicates the release of braking, the actuator controller is configured to cause the electric actuator to actuate the brake mechanism to release the braking regardless of whether the content of the new actuation request signal is the same as or different from the control state of the uncompleted control.

10. The electric brake apparatus according to claim 1, wherein, the actuator controller is configured not to cause the electric actuator to actuate the brake mechanism to hold the braking if the control state of the uncompleted control is unknown.

11. The electric brake apparatus according to claim 1, wherein, the brake mechanism includes a memory for storing a control state of the brake mechanism, and
when the system recovers from the system down, if the control state stored in the memory represents that the holding of braking or the release of braking is interrupted in the middle of the control, the actuator controller is configured to maintain the interrupted state in the middle of the control of the holding of braking or the release of braking until a new actuation request signal is issued, and is configured to control the operation of the electric actuator according to a content of the new actuation request signal when the new actuation request signal is issued.

12. An electric brake apparatus comprising:
an electric actuator configured to actuate a brake mechanism according to an actuation request signal; and
an actuator controller configured to control an operation of the electric actuator with use of a power source mounted at a vehicle to perform control of a holding of braking and a release of braking by the brake mechanism,
wherein, when a system recovers following interruption with a control state of an uncompleted control of the holding of braking or the release of braking by the brake mechanism after system down occurs and thus the electric actuator is stopped in a middle of the control of the holding of braking or the release of braking by the brake mechanism, when the vehicle is stopped, the actuator controller is configured to maintain a state in which the electric actuator was stopped during the system down, until a new actuation request signal according to a signal from a parking brake switch after recovery of the system and/or according to a logic of determining whether to hold or release the braking by the brake mechanism is issued, and is further configured to control operation of the electric actuator according to a content of the new actuation request signal when the new actuation request signal is issued regardless of whether the content of the new actuation request signal is the same as or different from the control state of the uncompleted control.

13. The electric brake apparatus according to claim 12, wherein, the actuator controller is further configured to cause the electric actuator to actuate the brake mechanism to hold the braking, when the vehicle is stopped and the content of the new actuation request signal indicates the holding of braking, when the control state of the uncompleted control indicates the holding of braking is in progress or the release of braking is in progress.

14. The electric brake apparatus according to claim 12, wherein, the actuator controller is further configured to cause the electric actuator to actuate the brake mechanism to release the braking, when the vehicle is stopped and the content of the new actuation request signal indicates the release of braking, when the control state of the uncompleted control indicates the holding of braking is in progress or the release of braking is in progress.

15. The electric brake apparatus according to claim 12, wherein, the actuator controller is further configured not to cause the electric actuator to actuate the brake mechanism to hold the braking when the control state of the uncompleted control is unknown.

16. An electric brake apparatus comprising:
an electric actuator configured to actuate a brake mechanism according to an actuation request signal; and
an actuator controller configured to control an operation of the electric actuator with use of a power source mounted at a vehicle to perform control of holding of braking and a release of braking by the brake mechanism,
wherein, when a system recovers following interruption with a control state of an uncompleted control of the holding of braking or the release of braking by the brake mechanism after system down occurs and thus the electric actuator is stopped in a middle of the control of the holding of braking or the release of braking by the brake mechanism, when the vehicle is stopped, the actuator controller is configured to maintain a state in which the electric actuator was stopped during the system down, until a new actuation request signal according to a signal from a parking brake switch after recovery of the system and/or according to a logic of determining whether to hold or release the braking by the brake mechanism is issued, and is further configured to control operation of the electric actuator according to a content of the new actuation request signal when the content of the new actuation request signal is a same as the control state of the uncompleted control while prohibiting a restart of the control according to the content indicated by the new actuation request signal when the content of the new actuation request signal is different from the control state of the uncompleted control, when the new actuation request signal is issued.

17. The electric brake apparatus according to claim 16, wherein, when the vehicle is stopped and the content of the new actuation request signal indicates the holding of braking, when the control state of the uncompleted control indicates the release of braking is in progress, the actuator controller is configured not to cause the electric actuator to actuate the brake mechanism to hold the braking.

18. The electric brake apparatus according to claim 16, wherein, when the vehicle is stopped and the new actuation request signal indicates the release of braking, when the control state of the uncompleted control indicates the holding of braking in progress, the actuator controller is configured not to cause the electric actuator to actuate the brake mechanism to release the braking.

19. The electric brake apparatus according to claim 16, wherein, the actuator controller is configured not to cause the electric actuator to actuate the brake mechanism to hold the braking when the control state of the uncompleted control is unknown.

* * * * *